(12) United States Patent
Kim et al.

(10) Patent No.: US 11,862,790 B1
(45) Date of Patent: Jan. 2, 2024

(54) LITHIUM SECONDARY BATTERY

(71) Applicant: SK ON CO., LTD., Seoul (KR)

(72) Inventors: Ji Hyung Kim, Daejeon (KR); Young Ha Kim, Daejeon (KR); Sang Bin Lee, Daejeon (KR); Ho Jin Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/335,604

(22) Filed: Jun. 15, 2023

(30) Foreign Application Priority Data

Jun. 28, 2022 (KR) .................. 10-2022-0078846

(51) Int. Cl.
*H01M 4/525* (2010.01)
*H01M 4/36* (2006.01)
*H01M 10/0525* (2010.01)
*H01M 4/02* (2006.01)

(52) U.S. Cl.
CPC .......... *H01M 4/366* (2013.01); *H01M 4/525* (2013.01); *H01M 10/0525* (2013.01); *H01M 2004/021* (2013.01)

(58) Field of Classification Search
CPC .. H01M 4/366; H01M 4/525; H01M 10/0525; H01M 2004/021
See application file for complete search history.

(56) References Cited

FOREIGN PATENT DOCUMENTS

| | | |
|---|---|---|
| CN | 108630941 A | 10/2018 |
| JP | 2003-168481 B2 | 6/2003 |
| JP | WO2020/067379 A1 | 4/2020 |
| JP | 6876880 B2 | 5/2021 |
| KR | 1020040073076 | 8/2004 |
| KR | 1020070024353 A | 3/2007 |
| KR | 1020130139711 A | 12/2013 |
| KR | 1020160055138 A | 5/2016 |
| KR | 1020160146580 A | 12/2016 |
| KR | 1020170069153 A | 6/2017 |
| KR | 1020180059736 A | 6/2018 |

*Primary Examiner* — Jane J Rhee
(74) *Attorney, Agent, or Firm* — IP & T GROUP LLP

(57) ABSTRACT

A lithium secondary battery includes a cathode including a cathode current collector and a cathode active material layer formed on the cathode current collector, and an anode including an anode current collector and an anode active material layer formed on the anode current collector. The anode active material layer has an area larger than that of the cathode active material layer. The cathode active material layer includes a central portion and an outer portion surrounding the central portion, and the outer portion has a specific capacity less than that of the central portion.

15 Claims, 2 Drawing Sheets

LITHIUM SECONDARY BATTERY

CROSS-REFERENCE TO RELATED APPLICATION AND CLAIM OF PRIORITY

This application claims priority to Korean Patent Applications No. 10-2022-0078846 filed on Jun. 28, 2022 in the Korean Intellectual Property Office (KIPO), the entire disclosure of which is incorporated by reference herein.

BACKGROUND

1. Field

The disclosures of this application relates to a lithium secondary battery.

2. Description of the Related Art

A secondary battery which can be charged and discharged repeatedly has been widely employed as a power source of a mobile electronic device such as a mobile phone, a laptop computer, etc.

A lithium secondary battery is widely developed and applied among various types of secondary batteries due to high operational voltage and energy density per unit weight, a high charging rate, a compact dimension, etc.

For example, the lithium secondary battery may include an electrode assembly including a cathode, an anode and a separation layer interposed between the cathode and the anode, and an electrolyte solution immersing the electrode assembly.

The cathode may include a cathode current collector and a cathode active material layer formed on the cathode current collector. The cathode active material include a cathode active material such as lithium metal oxide particles. The anode may include an anode current collector and an anode active material layer formed on the anode current collector. The anode active material layer include an anode active material such as graphite.

Insertion and deintercalation of lithium ions are repeated in the cathode active material layer and the anode active material layer, and charging and discharging of the lithium secondary battery may proceed.

If the anode active material layer accommodates only a portion of the lithium ions desorbed from the cathode active material layer, some lithium ions may be deposited on a surface of the anode active material layer. Accordingly, performance at the anode may be deteriorated and life-span of the lithium secondary battery may be degraded.

SUMMARY

According to an aspect of the present disclosures, there is provided a lithium secondary battery having improved operational stability and reliability.

A lithium secondary battery includes a cathode including a cathode current collector and a cathode active material layer formed on the cathode current collector, and an anode including an anode current collector and an anode active material layer formed on the anode current collector. The anode active material layer has an area larger than that of the cathode active material layer. The cathode active material layer includes a central portion and an outer portion surrounding the central portion, and the outer portion has a specific capacity less than that of the central portion.

In some embodiments, the anode active material layer may entirely cover the cathode active material layer in a planar direction.

In some embodiments, the anode active material layer includes an overlapping portion overlying the cathode active material layer in a planar direction and a margin portion that does not overlap the cathode active material layer.

In some embodiments, a ratio of an area of the overlapping portion relative to a total area of the anode active material layer may be in a range from 0.8 to 0.99 in the planar direction.

In some embodiments, a width of the margin portion may be in a range from 0.5 mm to 3 mm.

In some embodiments, a ratio of an area of the central portion relative to a total area of the cathode active material layer may be in a range from 0.8 to 0.98 in a planar direction.

In some embodiments, a ratio of a width of the outer portion formed at one side of the central portion relative to a width of the cathode active material layer may be in a range from 0.005 to 0.1 in a cross-section of the cathode active material layer in a width direction.

In some embodiments, a ratio of a width of the outer portion formed at one side of the central portion relative to a width of the cathode active material layer may be in a range from 0.0015 to 0.05 in a cross-section of the cathode active material layer in a length direction.

In some embodiments, a ratio of the specific capacity of the outer portion relative to the specific capacity of the central portion may be in a range from 0.5 to 0.97.

In some embodiments, the central portion may include a first cathode active material, and the outer portion may include a second cathode active material having a specific capacity less than that of the first cathode active material.

In some embodiments, the first cathode active material may include a first lithium metal oxide particle containing nickel, the second cathode active material may include a second lithium metal oxide particle containing nickel, and a concentration of nickel in the second lithium metal oxide particle may be less than a concentration of nickel in the first lithium metal oxide particle.

In some embodiments, a difference between the concentration of nickel in the first lithium metal oxide particle and the concentration of nickel in the second lithium metal oxide particle may be in a range from 5 mol % to 30 mol % among all elements except lithium and oxygen.

In some embodiments, the outer portion may include both the first lithium metal oxide particle and the second lithium metal oxide particle.

In some embodiments, a weight ratio of the second lithium metal oxide particle to the first lithium metal oxide particle in the outer portion may be in a range from 1/9 to 9.

In some embodiments, the cathode active material layer may have a thickness from 20 μm to 500 μm.

According to example embodiments, deposition of lithium on a surface of an anode active material layer may be suppressed during an operation of a lithium secondary battery. Accordingly, life-span of the lithium secondary battery may be improved.

DETAILED DESCRIPTION OF THE EMBODIMENTS

According to example embodiments, a lithium secondary battery including a cathode that includes regions having different specific capacities is provided.

Hereinafter, a lithium secondary battery according to example embodiments of the present disclosures will be described in detail with reference to the drawings. However, the drawings and embodiments herein are intended to provide examples, and the concepts and the spirits of the present disclosures is not limited thereto.

Figure 2:
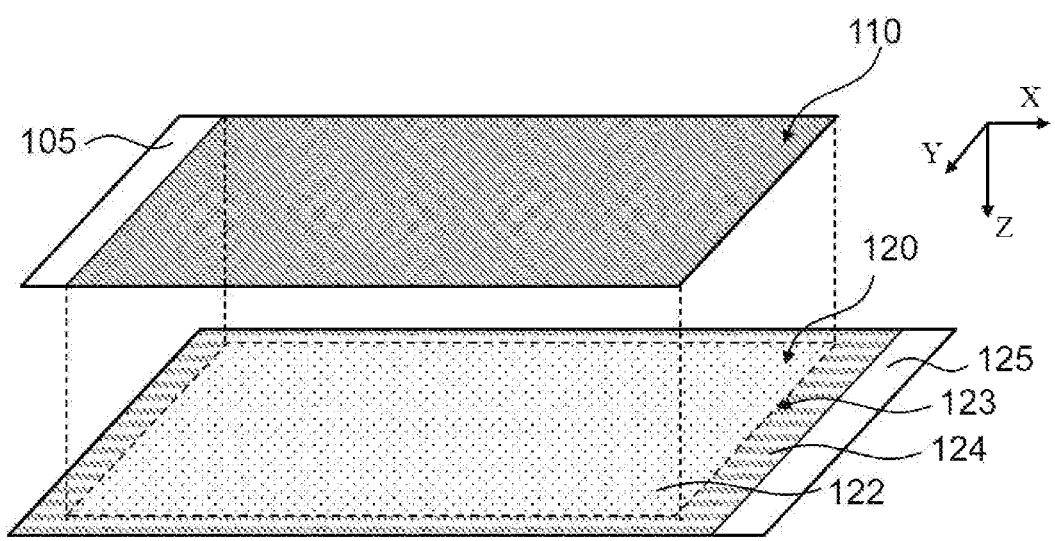
FIG. 2 is an exploded perspective view illustrating constructions of an anode and a cathode in accordance with an example embodiment.

The term "planar direction" used herein refers to a direction in which a cathode and an anode are stacked (e.g., a Z-direction in FIG. 2).

The term "width direction" used herein of an electrode (the cathode or the anode) active material layer is a direction (e.g., a Y direction of FIG. 2) in which the shortest side (or a short axis) of sides of the electrode active material layer extends when viewed in the planar direction. The term "cross-section in the width direction" refers to a cross-section of the electrode active material layer when the electrode active material layer is cut in the width direction (e.g., along a YZ plane of FIG. 2).

The term "length direction" used herein of the electrode (the cathode or the anode) active material layer refers to a direction (e.g., an X direction of FIG. 2) in which the longest side (or a long axis) of sides of the electrode active material layer extends when viewed from the planar direction. The term "cross-section in the length direction" may refer to a cross-section of the electrode active material layer when the electrode active material layer is cut in the length direction (e.g., along an XZ plane of FIG. 2). The "length direction" may be defined based on the surface of the electrode active material layer in the planar direction.

Figure 1:
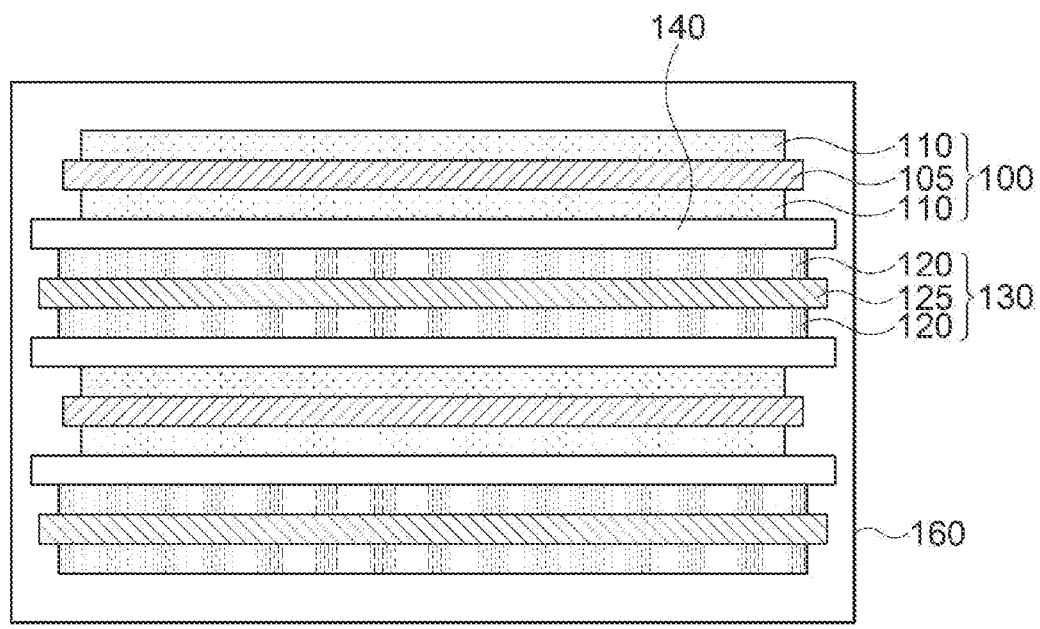
FIG. 1 is a schematic cross-sectional view of a lithium secondary battery in accordance with an example embodiment.

FIG. 1 is a schematic cross-sectional view of a lithium secondary battery in accordance with an example embodiment. FIG. 2 is an exploded perspective view illustrating constructions of an anode and a cathode in accordance with an example embodiment.

Referring to FIGS. 1 and 2, a lithium secondary battery according to example embodiments may include a cathode 100 and an anode 130 facing the cathode 100.

The cathode 100 may include a cathode current collector 105 and a cathode active material layer 110 formed on the cathode current collector 105. For example, the cathode active material layer 110 may be formed on one surface or both surfaces of the cathode current collector 105.

For example, the cathode active material layer 110 may include a cathode active material capable of reversibly intercalating and de-intercalating lithium ions. In some embodiments, the cathode active material layer 110 may further include a cathode binder and a conductive material.

The anode 130 may include an anode current collector 125 and an anode active material layer 120 formed on the anode current collector 125. For example, the anode active material layer 120 may be formed on one surface or both surfaces of the cathode current collector 125.

For example, the anode active material layer 120 may include an anode active material capable of reversibly intercalating and de-intercalating lithium ions. In some embodiments, the anode active material layer 120 may further include an anode binder and a conductive material.

When viewed in the planar direction, an area of the anode active material layer 120 may be greater than that of the cathode active material layer 110.

In one embodiment, the anode active material layer 120 may entirely cover the cathode active material layer 110 in the planar direction.

The anode active material layer 120 may include an overlapping portion 122 covered by the cathode active material layer in the planar direction and a margin portion 124 that does not overlap the cathode active material layer 110.

For example, the overlapping portion 122 may face the cathode active material layer 110, and the margin portion 124 may not face the cathode active material layer 110.

When the anode active material layer may accommodate only a portion of the lithium ions desorbed from the cathode active material layer, some lithium may be precipitated on a surface of the anode active material layer. As a result, the anode may be deteriorated and a life-span of the lithium secondary battery may be lowered.

According to example embodiments, the anode active material layer 120 may include the margin portion 124 to substantially entire lithium ions. Accordingly, the lithium precipitation may be suppressed.

In one embodiment, a ratio of a volume (or an area) of the overlapping portion 122 to a total volume (or an area) of the anode active material layer 110 may be from 0.8 to 0.99, from 0.85 to 0.97, or from 0.9 to 0.95. The area may refer to an area in the planar direction. Within the above range, reduction of an energy density of the lithium secondary battery due to the margin portion 124 may be prevented while suppressing the lithium precipitation.

In some embodiments, in a cross-section of the anode active material layer 120 in the width direction, a ratio of a width of the margin portion 124 formed at one side of the overlapping portion 122 relative to a width of the anode active material layer may be in a range from 0.002 to 0.1, from 0.004 to 0.05, from 0.01 to 0.03, or from 0.015 to 0.025. A width of the margin portion 124 formed at the other side of the overlapping portion 122 may also be within the above range.

In some embodiments, in a cross-section of the anode active material layer 120 in the length direction, a ratio of a width of the margin portion 124 formed at one side of the overlapping portion 122 relative to a width of the anode active material layer 120 may be in a range from 0.001 to 0.02, from 0.002 to 0.02, from 0.005 to 0.015, or from 0.01 to 0.015. A width of the margin portion 124 formed at the other side of the overlapping portion 122 may also be within the above range.

In some embodiments, the width of each of the margin portions 124 may be from about 0.5 mm to 3 mm, from about 0.75 mm to about 2.5 mm, or from about 1 mm to about 2 mm.

When the lithium secondary battery is left after being charged, some lithium ions inserted into the overlapping portion 122 may be diffused into the margin portion 124. Accordingly, a local lithium precipitation may occur locally around a boundary 123 between the overlapping portion 122 and the margin portion 124.

The local lithium precipitation may be effectively suppressed by using the cathode active material layer 110 according to example embodiments of the present disclosures.

Figure 3:
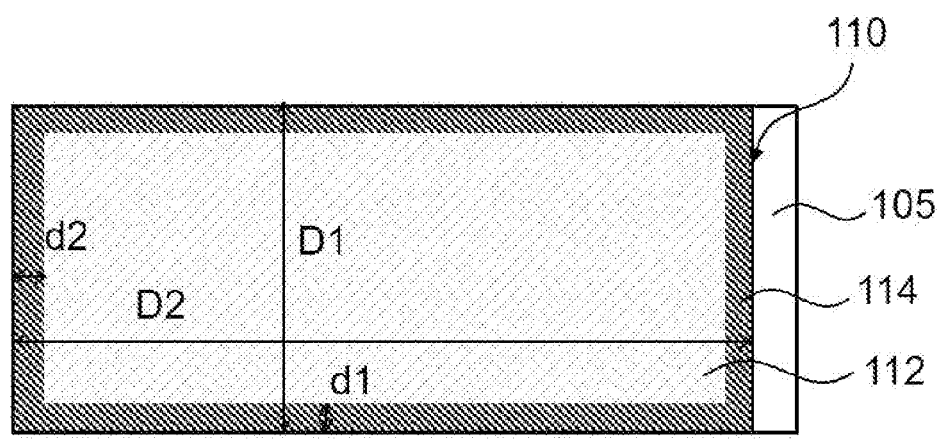
FIG. 3 is a schematic plan view of a cathode in accordance with an example embodiment.

FIG. 3 is a schematic plan view of a cathode according to an example embodiment.

Referring to FIG. 3, the cathode active material layer 110 may include an outer portion 114 formed along a periphery of the cathode active material layer 110 and a central portion 112 surrounded by the outer portion 114. For example, the central portion 112 may include a center of the cathode active material layer 110.

In one embodiment, the outer portion 114 may be formed to be adjacent to the periphery of the cathode active material layer 110. In some embodiments, the outer portion 114 may include the periphery of the cathode active material layer 110. For example, the outer portion 114 may be in contact with the periphery of the cathode active material layer 110.

In example embodiments, a specific capacity of the outer portion 114 may be smaller than that of the central portion 112. Accordingly, an amount of intercalated and deintercalated lithium ions may be relatively small around the boundary 123 of the overlapping portion 122 and the marginal portion 124. Thus, the diffusion of lithium ions into the margin portion 124 and the local lithium precipitation around the boundary 123 may be suppressed.

For example, the specific capacity refers to a capacity per unit weight (mAh/g). For example, the specific capacity refers to a utilization capacity (a reversible capacity) in a driving voltage range.

In one embodiment, a ratio of the specific capacity of the outer portion 114 relative to the specific capacity of the central portion 112 may be in a range from 0.5 to 0.95, from 0.7 to 0.97, from 0.85 to 0.97, or from 0.9 to 0.95. Within this range, the capacity of the cathode active material layer 110 may become higher, and the local lithium precipitation around the boundary 123 may be further suppressed.

In one embodiment, the central portion 112 may include a first cathode active material, and the outer portion 114 may include a second cathode active material having a specific capacity lower than that of the first cathode active material. In this case, the specific capacity of the central portion 112 may be adjusted to be higher than that of the outer portion 114.

In some embodiments, the first cathode active material may include first lithium metal oxide particles, and the second cathode active material may include second lithium metal oxide particles. A specific capacity of the first lithium metal oxide particle may be greater than that of the second lithium metal oxide particle.

In one embodiment, the first lithium metal oxide particles and the second lithium metal oxide particles may include lithium cobalt-based oxide (LCO) particles, lithium manganese-based oxide (LMO) particles, lithium nickel-based oxide (LNO) particles, lithium nickel-cobalt-manganese (NCM) oxide particles, lithium nickel-cobalt-aluminum (NCA) oxide particles, lithium iron phosphate (LFP) oxide particles, lithium excess oxide (OLO) particles, etc.

In some embodiments, the first lithium metal oxide particle may include a lithium excess oxide particle represented by Chemical Formula 1 below. In this case, the second lithium metal oxide particle may include a lithium metal oxide particle having a lower specific capacity than that of the lithium excess oxide particle.

$$xLi_2MnO_3 \cdot _{(1-x)}LiMO_2 \quad \text{[Chemical Formula 1]}$$

In Chemical Formula 1, M may include at least one of Ni, Mn, Co, Mg, V, Ti, Al, Fe, Ru, Zr, W, Sn, Nb and Mo, and $0.1 \leq x \leq 0.9$.

In some embodiments, the second lithium metal oxide particle may include a lithium phosphate-iron-based oxide particle represented by Chemical Formula 2 below. In this case, the first lithium metal oxide particle may include the lithium metal oxide particle having a higher specific capacity than that of the lithium phosphate-iron-based oxide particles.

$$LiFe_{1-x}M_xPO_4 \quad \text{[Chemical Formula 2]}$$

In Chemical Formula 2, M may include at least one of Ni, Co, Mn, Al, Mg, Y, Zn, In, Ru, Sn, Sb, Ti, Te, Nb, Mo, Cr, Zr, W, Ir and V, and $0 \leq x \leq 1$.

In some embodiments, each of the first lithium metal oxide particle and the second lithium metal oxide particle may contain nickel. A concentration of nickel in the first lithium metal oxide particle may be greater than a concentration of nickel in the second lithium metal oxide particle.

The concentration of nickel may refer to a mole percent (mol %) of nickel calculated based on the total number of moles of all elements except lithium and oxygen in the lithium metal oxide particle.

In some embodiments, the nickel concentration in the first lithium metal oxide particle may be 80 mol % or more, 85 mol % or more, 88 mol % or more, or 90 mol % or more.

In some embodiments, a difference between the concentration of nickel in the first lithium metal oxide particle and the concentration of nickel in the second lithium metal oxide particle may be from about 5 mol % to about 30 mol %, from about 10 mol % to about 25 mole %, or from about 10 mol % to 20 mol %.

In some embodiments, the first lithium metal oxide particle may include a lithium metal oxide particle represented by Chemical Formula 3 below, and the second lithium metal oxide particle may include a lithium metal oxide particle represented by Chemical Formula 4 below.

$$Li_{x1}Ni_{(1-a1-b1)}Co_{a1}M1_{b1}O_{y1} \quad \text{[Chemical Formula 3]}$$

In Chemical Formula 3, M1 may include at least one of Al, Zr, Ti, Cr, B, Mg, Mn, Ba, Si, Y, W and Sr, and $0.9 \leq x1 \leq 1.2$, $1.9 \leq y1 \leq 2.1$ and $0 \leq a1+b1 \leq 0.2$.

In some embodiments, $0 \leq a1+b1 \leq 0.12$, $0 \leq a1+b1 \leq 0.15$, or $0 \leq a1+b1 \leq 0.1$.

$$Li_{x2}Ni_{(1-a2-b2)}Co_{a2}M2_{b2}O_{y2} \quad \text{[Chemical Formula 4]}$$

In Chemical Formula 4, M2 may include at least one of Al, Zr, Ti, Cr, B, Mg, Mn, Ba, Si, Y, W and Sr, and $0.9 \leq x2 \leq 1.2$, $1.9 \leq y2 \leq 2.1$, and $0 \leq a2+b2 \leq 0.5$.

In some embodiments, $0.1 \leq a2+b2 \leq 0.4$ or $0.1 \leq a2+b2 \leq 0.3$.

In one embodiment, $0.05 \leq (a2+b2)-(a1+b1) \leq 0.3$, $0.1 \leq (a2+b2)-(a1+b1) \leq 0.25$, or $0.1 \leq (a2+b2)-(a1+b1) \leq 0.2$.

In some embodiments, the outer portion 114 may include both the first lithium metal oxide particle and the second lithium metal oxide particle together (e.g., a mixture). In this case, the diffusion of the lithium ion may be further prevented by the second lithium metal oxide particle. Additionally, the first lithium metal oxide particles may form a uniform conductive network in the central portion 112 and the outer portion 114, so that performance degradation of the lithium secondary battery due to the division of the central portion 112 and the outer portion 114 may be prevented.

In some embodiments, in the outer portion 114, a weight ratio of the second lithium metal oxide particles relative to the first lithium metal oxide particles may be in a range from 1/9 to 9, from 1/4 to 4, 3/7 to 4, or from 3/7 to 2/3.

In one embodiment, in a cross-section of the cathode active material layer 110 in the width direction, a ratio of a width of the outer portion 114 (d1 of FIG. 3) formed at one side of the central portion 112 relative to a width of the cathode active material layer 110 (D1 of FIG. 3) may be in a range from 0.001 to 0.2, from 0.002 to 0.2, from 0.005 to 0.1, or from 0.005 to 0.02. A width of the outer portion 114 formed at the other side of the central portion 112 may also be within the above range. Within the above range, capacity degradation due to the outer portion 114 may be prevented, and the local lithium precipitation around the boundary 123 may be further suppressed.

In one embodiment, in a cross-section in the length direction of the cathode active material layer 110, a ratio of a width of the outer portion 114 (d2 in FIG. 3) formed at one side of the central portion 112 relative to a width of the cathode active material layer 110 (D2 in FIG. 3) may be in a range from 0.0005 to 0.05, from 0.001 to 0.05, from 0.0015 to 0.05, from 0.0015 to 0.0025, or from 0.0015 to 0.01, or from 0.0015 to 0.005. A width of the outer portion 114 formed on the other side of the central portion 112 may also be within the above range. Within the above range, capacity degradation due to the outer portion 114 may be prevented, and the local lithium precipitation around the boundary 123 may be further suppressed.

In some embodiments, the width of each of the outer portions 114 (e.g., d1 and d2 in FIG. 3) may be in a range from about 0.1 mm to about 3 mm, from about 0.2 mm to 2.5 mm, from about 0.3 mm and 2.5 mm, or from about 0.3 mm to about 2.4 mm. Within the above range, the local lithium precipitation around the boundary 123 may be further suppressed.

In one embodiment, a ratio of a volume (or an area) of the central portion 112 relative to a total volume (or an area) of the cathode active material layer 110 may be in a range from 0.8 to 0.98, from 0.85 to 0.96, or from 0.9 to 0.95. The area refers to an area in the planar direction.

In one embodiment, a density of the cathode active material layer 110 may be 3.5 g/cc or more, 3.7 g/cc or more, or 3.9 g/cc or more. Further, the density of the cathode active material layer 110 may be 4.0 g/cc or less.

In one embodiment, a thickness of the cathode active material layer 110 may be in a range from about 20 μm to 500 μm.

For example, the outer portion 114 may be formed on the cathode current collector 105, and then the central portion 112 may be formed. Alternatively, the central portion 112 may be formed in advance, and then the outer portion 114 may be formed.

For example, a first cathode slurry for forming the central portion 112 may be prepared. The first cathode slurry may include the first cathode active material, the cathode conductive material, the binder and a dispersion medium.

A second cathode slurry for forming the outer portion 114 may be prepared. The second cathode slurry may include the second cathode active material, the cathode conductive material, the binder and the dispersion medium.

For example, the first cathode slurry may be applied to a region of the cathode current collector 105 to which the central portion 112 is allocated. The second cathode slurry may be applied to a region of the cathode current collector 105 to which the outer portion 114 is allocated. The order of application of the first cathode slurry and the second cathode slurry is not particularly limited.

The coated first and second cathode slurries may be dried and pressed to form the cathode active material layer 110.

For example, the cathode current collector 105 may include stainless steel, nickel, aluminum, titanium, copper, or an alloy thereof.

For example, the cathode binder may include an organic based binder such as polyvinylidenefluoride (PVDF), a vinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

The conductive material may include a carbon-based material such as graphite, carbon black, graphene, carbon nanotube, etc., and/or a metal-based material such as tin, tin oxide, titanium oxide, a perovskite material such as LaSrCoO$_3$ or LaSrMnO$_3$, etc.

An anode slurry may be prepared by mixing and stirring the anode active material, the anode binder, the conductive material, a solvent, etc. The anode slurry may be coated on the anode current collector 125, and then dried and pressed to form the anode 130.

For example, the anode current collector 125 may include gold, stainless-steel, nickel, aluminum, titanium, copper or an alloy thereof, preferably, may include copper or a copper alloy.

For example, the anode active material may include a lithium alloy, a carbon-based material, a silicon-based material, etc.

For example, the lithium alloy may include a metal element such as aluminum, zinc, bismuth, cadmium, antimony, silicon, lead, tin, gallium, indium, etc.

For example, the carbon-based active material may include a crystalline carbon, an amorphous carbon, a carbon complex, a carbon fiber, etc.

The amorphous carbon may include, e.g., a hard carbon, cokes, a mesocarbon microbead (MCMB) fired at a temperature of 1500° C. or less, a mesophase pitch-based carbon fiber (MPCF), etc. The crystalline carbon may include, e.g., artificial graphite, natural graphite, graphitized cokes, graphitized MCMB, graphitized MPCF, etc.

In one embodiment, the anode active material may include the silicon-based active material. The silicon-based active material may include, e.g., Si, SiO$_x$ (0<x<2), Si/C, SiO/C, Si-metal, etc.

For example, the anode binder and the conductive material may include materials substantially the same as or similar to those used for the cathode.

In one embodiment, a separation layer 140 may be interposed between the cathode 100 and the anode 130.

For example, the separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

For example, an electrode cell may be formed including the anode 100, the cathode 130 and the separation layer 140. A plurality of the electrode cells may be stacked to form an electrode assembly 150.

For example, the electrode assembly 150 may be formed by z-folding, winding, or stacking of the separation layer 140.

Figure 4:
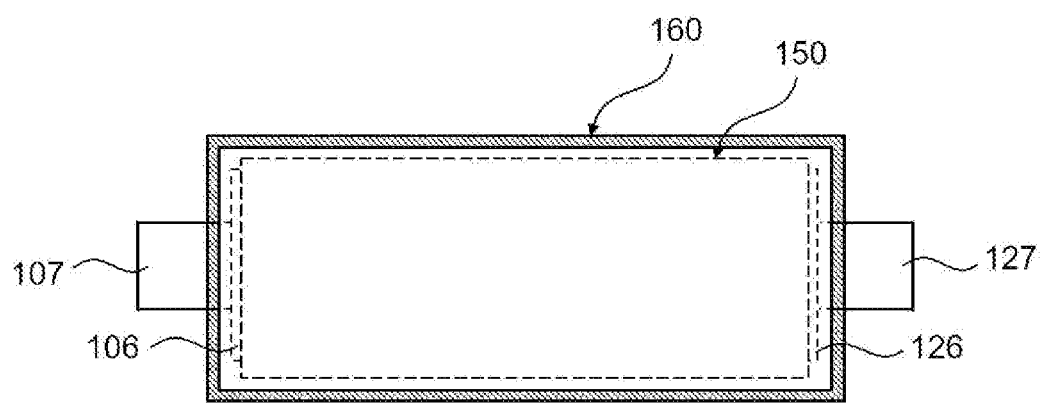
FIG. 4 is a schematic plan view illustrating a lithium secondary battery in accordance with an example embodiment.

FIG. 4 is a schematic plan view illustrating a lithium secondary battery in accordance with an example embodiment.

Referring to FIG. 4, the lithium secondary battery may include a cathode lead 107 connected to the cathode 100 of the electrode assembly 150 to protrude to an outside of a case 160, and an anode lead 127 connected to the anode 130 of the electrode assembly 150 to protrude to the outside of the case 160.

For example, the cathode 100 and the cathode lead 107 may be electrically connected to each other. The anode 130 and the anode lead 127 may be electrically connected to each other.

For example, the cathode lead 107 may be electrically connected to the cathode current collector 105. The anode lead 130 may be electrically connected to the anode current collector 125.

The cathode current collector 105 may include a protrusion at one side thereof. For example, the cathode current collector 105 may include a cathode tab 106. The cathode active material layer 110 may not be formed on the cathode tab 106. The cathode tab 106 may be integral with the cathode current collector 105 or may be connected to the cathode current collector 105 by, e.g., welding. The cathode current collector 105 and the cathode lead 107 may be electrically connected via the cathode tab 106.

The anode current collector 125 may include a protrusion at one side thereof. For example, the anode current collector 125 may include an anode tab 136. The anode active material layer 120 may not be formed on the anode tab 126. The anode tab 126 may be integral with the anode current collector 125 or may be connected to the anode current collector 125 by, e.g., welding. The anode electrode current collector 125 and the anode lead 127 may be electrically connected via the anode tab 126.

For example, the electrode assembly 150 and an electrolyte may be accommodated together in the case to form the lithium secondary battery.

The lithium secondary battery may be fabricated into a cylindrical shape, a prismatic shape, a pouch shape, a coin shape, etc.

Hereinafter, preferred embodiments are proposed to more concretely describe the present disclosures. However, the following examples are only given for illustrating the present disclosures and those skilled in the related art will obviously understand that various alterations and modifications are possible within the scope and spirit of the present disclosures. Such alterations and modifications are duly included in the appended claims.

Example 1

(1) Fabrication of Cathode $LiNi_{0.8}Co_{0.1}Mn_{0.1}O_2$ (hereinafter, that may be referred to as NCM811) was used as a first cathode active material. A first cathode slurry was prepared by dispersing the first cathode active material, polyvinylidene fluoride (PVdF) and carbon black in N-methyl pyrrolidone (NMP) in a weight ratio of 92:4:4.

NCM811 and $LiNi_{0.5}Co_{0.2}Mn_{0.3}O_2$ (hereinafter, that may be referred to as NCM523) were blended in a weight ratio of 5:5 to be used as a second cathode active material. A second cathode slurry was prepared by dispersing the second cathode active material, PVdF and carbon black in NMP in a weight ratio of 92:4:4.

An aluminum foil (12 μm×300 mm×100 mm) was prepared as a cathode current collector. A region of the aluminum foil excluding one end portion in a length direction was allocated as a cathode active material layer region (290 mm×100 mm).

The cathode active material layer region is divided into a first region (i.e., an outer portion) located along a periphery of the cathode active material layer region and a second region (i.e., a central portion) surrounded by the first region. A width of the first region (referring to FIG. 3, d1 and d2) was set to 0.5 mm.

The first cathode slurry was coated on the second region, and the second cathode slurry was coated on the first region, followed by drying and pressing to form a cathode.

Coating amounts per unit area of the first cathode slurry and the second cathode slurry were the same, and a thickness of the cathode active material layer was 125 μm.

(2) Fabrication of Lithium Secondary Battery

An anode active material in which artificial graphite and natural graphite were mixed in a weight ratio of 7:3, SBR and carboxymethyl cellulose (CMC) were dispersed in distilled water in a weight ratio of 97:1:2 to prepare an anode slurry.

A copper foil was prepared as an anode current collector. The anode slurry was coated on a region of the copper foil excluding one end portion in the length direction, and then dried and pressed to form an anode.

A length of the anode active material layer was set to be larger than a length of the cathode active material layer by 2 mm, and a width of the anode active material layer was set to be larger than a width of the cathode active material layer by 2 mm.

An electrode assembly was formed by stacking the cathode and the anode with a polyethylene separator (thickness: 20 μm) interposed therebetween.

In the planar direction, widths of regions (i.e., margin portions) of the anode active material layer that did not overlap the cathode active material layer were adjusted to be 1 mm.

A cathode lead and an anode lead were connected to the one end portions of the aluminum foil and the copper foil, respectively.

After preparing a 1 M $LiPF_6$ solution (30:70 v/v EC/EMC mixed solvent), 1 wt % of FEC (fluoroethylene carbonate), 0.3 wt % of VC (vinylethylene carbonate), 1 wt % of $LiPO_2F_2$ (lithium difluorophosphate), 0.5 wt % of PS (1,3-propane sultone) and 0.5 wt % of PRS (prop-1-ene-1,3-sultone) based on 100 wt % of a total electrolyte solution were added to prepare an electrolyte solution.

The electrode assembly was housed in a pouch (case) so that partial regions of the cathode lead and the anode lead were exposed to an outside, and three sides except for an electrolyte injection side were sealed.

An electrolyte solution was injected into the pouch and the electrolyte injection side was also sealed to prepare a sample of a lithium secondary battery.

Comparative Example

A lithium secondary battery was fabricated by the same method as that in Example 1, except that the first cathode slurry was coated on an entire region for the cathode active material layer without dividing the first and second regions.

Examples 2 to 4

A lithium secondary battery was fabricated by the same method as that in Example 1, except that the width of the first region (the outer portion) was adjusted as shown in Table 1 below.

Examples 5 to 7

A lithium secondary battery was fabricated by the same method as that in Example 1, except that the mixing weight ratio of NCM 811 and NCM 523 in the second cathode slurry was adjusted as shown in Table 1 below.

Experimental Example (1) Calculation of a Ratio of Specific Capacities of the Second Cathode Active Material to the First Cathode Active Material Based on specific capacities of NCM 811 and NCM 523 below, a specific capacity of the second cathode active material was calculated proportionally according to the mixing weight ratio.

Specific capacity of NCM 811 (reversible capacity in 2.5V-4.2V voltage range): about 200 mAh/g Specific capacity of NCM 523 (reversible capacity in 2.5V-4.2V voltage range): about 170 mAh/g A specific capacity ratio was calculated by dividing the specific capacity of the second cathode active material by a specific capacity of the first cathode active material (i.e., the specific capacity of NCM 811).

(2) Evaluation on Room Temperature (25° C.) Discharge Capacity

The lithium secondary batteries of Examples and Comparative Example were 0.5C CC/CV charged (4.2V 0.05C CUT-OFF) and 0.5C CC discharged (2.5V CUT-OFF).

The charging and discharging were repeated three times, and the discharge capacity was measured at the third cycle.

(3) Evaluation on Lithium Precipitated Amount

The lithium secondary batteries of Examples and Comparative Examples were 3C CC/CV charged (4.2V 0.05C CUT-OFF) and 0.5C CC discharged (2.5V CUT-OFF).

The charging and discharging were repeated 10 times.

After completing the charging and discharging, the lithium secondary batteries was disassembled to separate the anode.

The separated anode was treated with hydrochloric acid and hydrogen peroxide, and then a heat treatment was performed in a heating block to prepare a test solution.

The test solution was diluted with ultrapure water and filtered. The filtrate was subjected to an ICP emission spectrometry to measure an amount of precipitated lithium precipitated in the filtrate. The amount of lithium precipitation was calculated as a percentage of a lithium content based on a total weight of the filtrate.

Referring to Table 1, in the lithium secondary batteries of Examples, the amount of lithium precipitation was reduced compared to that of Comparative Example.

What is claimed is:

1. A lithium secondary battery, comprising:
   a cathode comprising a cathode current collector and a cathode active material layer formed on the cathode current collector; and
   an anode comprising an anode current collector and an anode active material layer formed on the anode current collector, the anode active material layer having an area larger than that of the cathode active material layer,
   wherein the cathode active material layer comprises a central portion and an outer portion surrounding the central portion, and the outer portion has a specific capacity less than that of the central portion.

2. The lithium secondary battery of claim 1, wherein the anode active material layer entirely covers the cathode active material layer in a planar direction.

3. The lithium secondary battery of claim 1, wherein the anode active material layer comprises an overlapping portion overlying the cathode active material layer in a planar direction and a margin portion that does not overlap the cathode active material layer.

4. The lithium secondary battery of claim 3, wherein a ratio of an area of the overlapping portion relative to a total area of the anode active material layer is in a range from 0.8 to 0.99 in the planar direction.

5. The lithium secondary battery of claim 3, wherein a width of the margin portion is in a range from 0.5 mm to 3 mm.

6. The lithium secondary battery of claim 1, wherein a ratio of an area of the central portion relative to a total area of the cathode active material layer is in a range from 0.8 to 0.98 in a planar direction.

7. The lithium secondary battery of claim 1, wherein a ratio of a width of the outer portion formed at one side of the central portion relative to a width of the cathode active material layer is in a range from 0.005 to 0.1 in a cross-section of the cathode active material layer in a width direction.

8. The lithium secondary battery of claim 1, wherein a ratio of a width of the outer portion formed at one side of the central portion relative to a width of the cathode active material layer is in a range from 0.0015 to 0.05 in a cross-section of the cathode active material layer in a length direction.

TABLE 1

| | width of outer portion (mm) | mixing weight ratio of second cathode slurry NCM811:NCM 523 | specific capacity ratio of second cathode active material to first cathode active material | discharge capacity (mAh/g) | lithium precipitation (wt %) |
|---|---|---|---|---|---|
| Example 1 | 0.5 | 5:5 | 185/200 | 185.41 | 0.61 |
| Example 2 | 1 | 5:5 | 185/200 | 185.25 | 0.52 |
| Example 3 | 0.25 | 5:5 | 185/200 | 185.50 | 0.71 |
| Example 4 | 2.5 | 5:5 | 185/200 | 184.82 | 0.50 |
| Example 5 | 0.5 | 6:4 | 188/200 | 185.45 | 0.61 |
| Example 6 | 0.5 | 2:8 | 176/200 | 185.30 | 0.58 |
| Example 7 | 0.5 | 8:2 | 194/200 | 185.53 | 1.5 |
| Comparative Example | — | — | 200 | 185.60 | 2.1 |

9. The lithium secondary battery of claim 1, wherein a ratio of the specific capacity of the outer portion relative to the specific capacity of the central portion is in a range from 0.5 to 0.97.

10. The lithium secondary battery of claim 1, wherein the central portion comprises a first cathode active material, and the outer portion comprises a second cathode active material having a specific capacity less than that of the first cathode active material.

11. The lithium secondary battery of claim 10, wherein the first cathode active material includes a first lithium metal oxide particle containing nickel,
   the second cathode active material includes a second lithium metal oxide particle containing nickel, and
   a concentration of nickel in the second lithium metal oxide particle is less than a concentration of nickel in the first lithium metal oxide particle.

12. The lithium secondary battery of claim 11, a difference between the concentration of nickel in the first lithium metal oxide particle and the concentration of nickel in the second lithium metal oxide particle is in a range from 5 mol % to 30 mol % among all elements except lithium and oxygen.

13. The lithium secondary battery of claim 11, wherein the outer portion comprises both the first lithium metal oxide particle and the second lithium metal oxide particle.

14. The lithium secondary battery of claim 13, wherein a weight ratio of the second lithium metal oxide particle to the first lithium metal oxide particle in the outer portion is in a range from 1/9 to 9.

15. The lithium secondary battery of claim 1, wherein the cathode active material layer has a thickness from 20 μm to 500 μm.

* * * * *